US007165400B2

(12) United States Patent
Whelan et al.

(10) Patent No.: US 7,165,400 B2
(45) Date of Patent: Jan. 23, 2007

(54) LOCOMOTIVE ENGINE EMISSION CONTROL AND POWER COMPENSATION

(75) Inventors: John Whelan, Erie, PA (US); Eric Laribee, Waterford, PA (US); Bhupinder Dayal, Fairview, PA (US); Vishwesh Palekar, Erie, PA (US)

(73) Assignee: General Electric Company, Schenectady, NY (US)

(*) Notice: Subject to any disclaimer, the term of this patent is extended or adjusted under 35 U.S.C. 154(b) by 10 days.

(21) Appl. No.: 11/013,936

(22) Filed: Dec. 15, 2004

(65) Prior Publication Data

US 2005/0204739 A1 Sep. 22, 2005

Related U.S. Application Data

(60) Provisional application No. 60/530,128, filed on Dec. 16, 2004.

(51) Int. Cl.

| | |
|---|---|
| ***F02D 23/00*** | (2006.01) |
| ***F02F 3/00*** | (2006.01) |
| ***F01D 1/02*** | (2006.01) |
| ***F03B 1/04*** | (2006.01) |
| *F02B 37/00* | (2006.01) |
| *F03D 1/04* | (2006.01) |
| *F04D 29/44* | (2006.01) |
| *F04D 29/54* | (2006.01) |

(52) U.S. Cl. ...................... 60/602; 123/193.6; 415/205

(58) Field of Classification Search .................. 60/602, 60/605.1, 613, 614; 123/559.1, 193.4, 193.5, 123/193.6, 19.63; 415/158, 205; 417/407
See application file for complete search history.

(56) References Cited

U.S. PATENT DOCUMENTS

| | | | | |
|---|---|---|---|---|
| 4,138,849 | A * | 2/1979 | Wilber | 60/602 |
| 4,586,336 | A * | 5/1986 | Horler | 60/602 |
| 4,776,168 | A * | 10/1988 | Woollenweber | 60/602 |
| 4,898,135 | A * | 2/1990 | Failla et al. | 123/193.6 |
| 5,029,562 | A * | 7/1991 | Kamo | 123/193.6 |
| RE34,803 | E | 12/1994 | Chasteen | |
| 5,494,018 | A | 2/1996 | Black et al. | |
| 5,855,117 | A * | 1/1999 | Sumser et al. | 60/602 |
| 6,158,416 | A | 12/2000 | Chen et al. | |
| 6,158,956 | A * | 12/2000 | Arnold | 415/158 |
| 6,216,459 | B1 * | 4/2001 | Daudel et al. | 60/602 |
| 6,286,480 | B1 | 9/2001 | Chen et al. | |
| 6,318,308 | B1 | 11/2001 | Hsu et al. | |
| 6,360,710 | B1 * | 3/2002 | Christenson et al. | 123/193.6 |
| 6,561,157 | B2 * | 5/2003 | zur Loye et al. | 123/435 |
| 6,672,061 | B2 * | 1/2004 | Schmid et al. | 60/602 |
| 6,694,735 | B2 * | 2/2004 | Sumser et al. | 60/605.2 |
| 6,715,288 | B1 * | 4/2004 | Engels et al. | 60/602 |
| 6,810,666 | B2 * | 11/2004 | Lutz et al. | 60/602 |
| 6,866,028 | B2 * | 3/2005 | Mahakul et al. | 123/193.6 |
| 6,907,870 | B2 * | 6/2005 | zur Loye et al. | 123/435 |
| 2003/0221676 | A1 | 12/2003 | Glenn et al. | |

* cited by examiner

*Primary Examiner*—Thai-Ba Trieu
(74) *Attorney, Agent, or Firm*—Gerald W. Spinks

(57) ABSTRACT

A method and apparatus for lowering NOx in diesel engine exhaust gases while maintaining thermal efficiency, by retarding the start of fuel injection, increasing the compression ratio, and reducing the turbocharger inlet flow area to increase turbocharger speed and inlet manifold boost levels for the engine intake air.

2 Claims, 5 Drawing Sheets

LOCOMOTIVE ENGINE EMISSION CONTROL AND POWER COMPENSATION

CROSS REFERENCE TO RELATED APPLICATIONS

This application claims the benefit of U.S. Provisional Pat. App. No. 60/530,128, filed Dec. 16, 2004, for "Locomotive Engine Emission Control and Power Compensation".

STATEMENT REGARDING FEDERALLY SPONSORED RESEARCH OR DEVELOPMENT

Not Applicable

BACKGROUND OF THE INVENTION

1. Field of the Invention

This invention relates to diesel engines for locomotives and the like; and, more particularly, to diesel engines whose emissions must meet Tier 0 emissions standards promulgated by the Environmental Protection Agency (EPA).

2. Background Art

In a diesel engine, fuel is directly injected into a cylinder of compressed air at a high temperature. The fuel is broken up into droplets which evaporate and mix with the air forming a combustible mixture. Products of combustion of this mixture are exhaust emissions that include hydrocarbons (HC), nitrogen oxides (NOx), carbon monoxide (CO), and particulate matter (PM). To reduce the amount of pollution in the atmosphere, the EPA regulates the emission level of these various exhaust products that is acceptable. Over time, the acceptable levels of emissions have been significantly reduced.

Attainment of these standards involves consideration of a number of factors relating to engine operation. These include such things as injection pressure and injection timing, nozzle spray patterns, hydraulic flow, manifold air temperature, compression ratio, and air/fuel ratios. As will be appreciated by those skilled in the art, changes to effect reduction of one type of emission may well result in an increase in another emission component. For example, retarding fuel injection timing, which effectively reduces NOx, also affects engine performance.

It is desirable, therefore, to effect a strategy for in-cylinder combustion which satisfies the Tier 0 requirements for NOx, while at the same time maintaining an acceptable level of engine performance, including fuel consumption.

BRIEF SUMMARY OF THE INVENTION

Briefly stated, the present invention is directed to a method and apparatus for improving the operation of a locomotive diesel engine so as to reduce NOx produced by the combustion of an air/fuel mixture. The reduction is to a level which meets or surpasses EPA Tier 0 requirements for such emissions. While satisfying the requirements for NOx, the method and apparatus of the invention further maintain the level of performance of the engine.

Examples of various engine characteristics may be discussed herein in order to illustrate the features and functions of the present invention. It should be understood that the present invention is useful on engine types which may differ from the examples given herein. For purposes of illustration only, the type of engine used as an example herein could be a mechanical unit injection, turbocharged, two stroke (two cycle) medium-speed diesel engine. The present invention could also be useful in four stroke engines. The invention could also apply to engines having electronic control units. Engines are available in 8, 12, 16, and 20 cylinder configurations, but the invention could also apply to other configurations. Where given, specific emission standards and solutions addressed herein are predominantly applicable to a 16 cylinder engine, since this is the most common locomotive engine type; however, this is done for purposes of example only. The same principles, methods, and apparatus are also applicable to other engine types, such as marine engines.

The method of the invention involves retarding the start of injection (SOI) of fuel into the cylinder. If desired, this can be accompanied by reducing the air temperature (MAT) in the diesel engine's intake manifold. The invention also involves compensating for the loss of thermal efficiency resulting from retarding the start of fuel injection by increasing the compression ratio. This may be effected by causing the piston crown to more closely approach the cylinder head at the top of the stroke, such as by raising the height of the crown of each piston. This invention further involves compensating for a loss of turbocharger performance caused by the reduced level of exhaust gas energy resulting from the increase in compression ratio by increasing the flow velocity of the exhaust gases impinging the drive side or drive turbine of the turbocharger. This invention effects this increase in exhaust gas velocity to the turbocharger by selectively decreasing the turbocharger inlet nozzle cross sectional flow area.

The novel features of this invention, as well as the invention itself, will be best understood from the attached drawings, taken along with the following description, in which similar reference characters refer to similar parts, and in which:

DETAILED DESCRIPTION OF THE INVENTION

Figure 1:
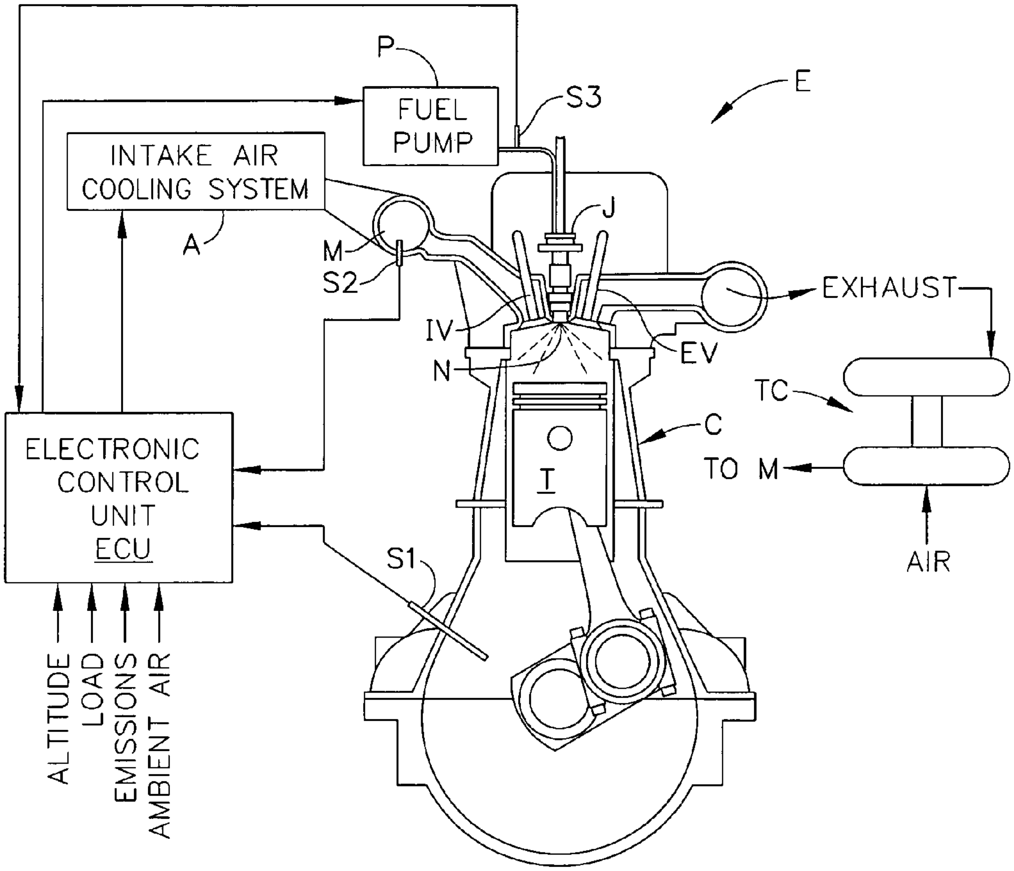
FIG. 1 is a simplified representation of a diesel engine.

Referring to the drawings, a diesel engine E has a plurality of combustion chambers or cylinders C, only one of which is shown in FIG. 1. As is well known in the art, air at an elevated temperature flows through an intake manifold M and is drawn into the combustion chamber through an intake valve IV and compressed by movement of a piston T. Air temperature in the intake manifold M is controlled by an intake air cooling system A which includes, for example, an aftercooler and a fluid coolant (not shown). Functions such as injection timing could be controlled by an electronic control unit as shown, or they could be controlled mechanically through the use of apparatus which is known in the art. Air pressure in the intake manifold M is increased by an exhaust driven turbocharger TC. Fuel supplied by a fuel pump P is injected into the combustion chamber through the nozzle N of an injector J and the resulting air/fuel mixture is burned. The products of combustion are then exhausted from the combustion chamber through an exhaust valve EV. As noted previously, the exhaust emissions include hydrocarbons (HC), nitrogen oxides (NOx), carbon monoxide (CO), and particulate matter (PM). As also noted, the EPA establishes standards for these emissions which the engine E must meet or surpass in order to be acceptable for use. The exhaust gases are ducted to the inlet turbine of a turbocharger TC, which turns the compressor turbine. The compressor turbine takes in ambient air and compresses it to a higher pressure for ducting into the intake manifold M, via the cooling system. Raising the intake air pressure contributes to overall engine performance and thermal efficiency, both of which can be represented as a level of fuel consumption for a given horsepower output.

Figure 2:
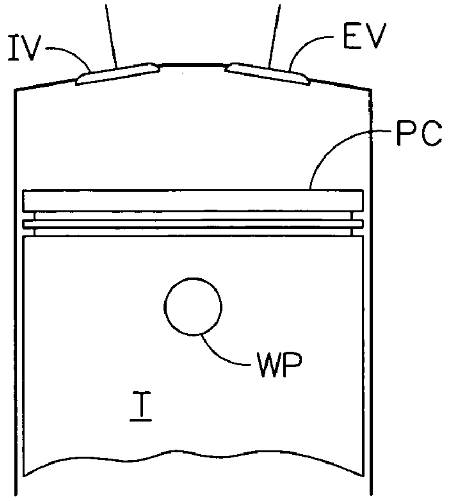
FIG. 2 (PRIOR ART)
FIG. 2 is a schematic representation of a nominal piston configuration in a cylinder.
Figure 3:
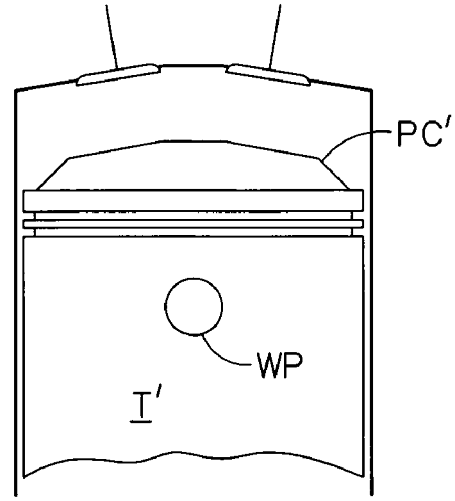
FIG. 3 is a schematic representation of a piston having an increased crown height, as compared to the nominal configuration shown in FIG. 2.

FIGS. 2 through 5 illustrate the meanings of some relative terms used herein, namely "increased piston crown height" and "reduced turbocharger inlet area". More specifically, FIG. 2 shows a nominal configuration of a piston T in a cylinder, with the piston crown PC having a nominal height, relative to the axis of the wrist pin WP. One skilled in the art will recognize that the nominal piston crown height will be the result of several considerations in the design of the overall engine, and it will play a critical role in determining the nominal compression ratio of the engine. The piston crown PC is shown as being flat in FIGS. 1 and 2, but it could also have a domed shape. FIG. 3 shows a piston T' having a piston crown PC' with an increased height above the wrist pin WP, as compared with the nominal height of the piston crown PC shown in FIG. 2. So, the term "increased piston crown height" is defined by comparing the relative heights of the piston crowns shown in FIGS. 2 and 3, as this term is simply intended to denote an increased piston crown height relative to a nominal piston crown height for a given engine. One skilled in the art will recognize that, all else being equal, the increased height of the piston crown PC' in FIG. 3 will result in an increased compression ratio. Alternatively, an increased compression ratio may also be achieved within the scope of this invention by retaining the piston crown height and reducing (or lowering) the cylinder head height so as to be closer to the piston crown when the piston is in top dead center position. Combinations of increased piston crown height and reduced cylinder head height to increase the compression ratio are also within the scope of this invention.

Figure 4:
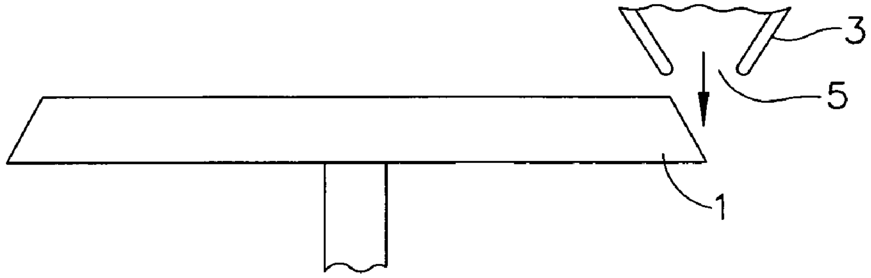
FIG. 4 (PRIOR ART)
FIG. 4 is a schematic representation of a nominal turbocharger inlet configuration.

Further, FIG. 4 shows a schematic representation of a nominal configuration of a turbocharger inlet nozzle 3 directing exhaust gases, denoted by the flow arrow, toward the inlet turbine 1 of the turbocharger. The inlet turbine is mechanically linked to the compressor turbine which compresses air for introduction into the intake manifold M. The inlet nozzle 3 has a nominal flow area 5. The nominal flow area 5 together with other engine operating parameters and design criteria determine the speed of the exhaust gas exiting the turbocharger inlet and thus the nominal rotational speed of the turbocharger TC, as well as the nominal boost level achieved by the turbocharger TC. The actual shape of the inlet nozzle 3 and its orientation relative to the inlet turbine 1 are depicted in schematic. Various shapes and orientations may be utilized.

Figure 5:
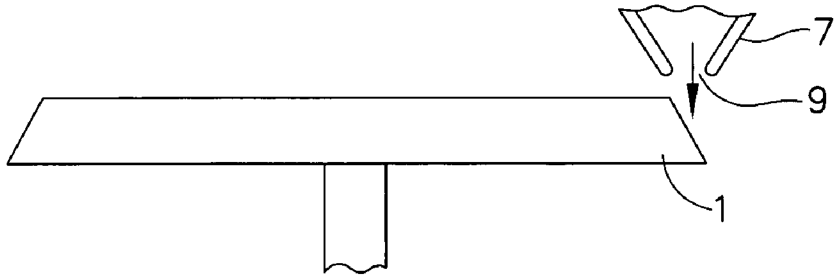
FIG. 5 is a schematic representation of a turbocharger inlet configuration having a decreased flow area, as compared to the nominal configuration shown in FIG. 4.

FIG. 5 shows an inlet nozzle 7 of this invention constituting an inlet nozzle ring having a flow area 9 selected to present a smaller cross sectional area for the flow of the exhaust gases as compared with the nominal flow area 5 of the prior art inlet nozzle 3 shown in FIG. 4. The term "reduced turbocharger inlet area" as used hereinafter is defined by comparing the relative cross sectional areas of the inlet nozzles shown in FIGS. 4 and 5 available for flow of exhaust gas under pressure from the engine and thus denotes a reduced exhaust gas flow area relative to a nominal inlet nozzle flow area for a given turbocharger. The reduced flow area 9 of the inlet nozzle 7 of this invention in FIG. 5 generates an increased exhaust gas flow velocity impinging on the turbocharger turbine. This increased exhaust gas flow velocity results in an increased turbocharger rotational speed, and an increased turbocharger boost level, as compared to a lower exhaust gas flow velocity. For the reduced exhaust gas volume flow rate produced by applicants' low emission, high compression engine, this increased flow velocity increases the total exhaust gas energy level available to compress the intake air to the engine.

Figure 6:
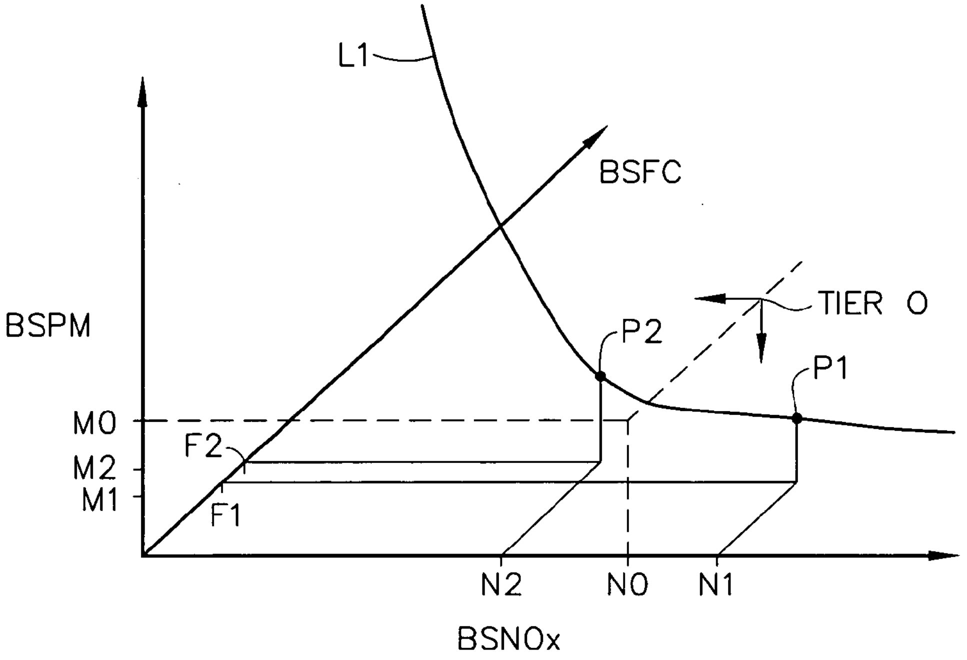
FIG. 6 is a three-dimensional chart plotting brake specific NOx (BSNOx), brake specific particulate matter (BSPM), and brake specific fuel consumption (BSFC) for a nominal set of engine operating conditions, and illustrating the effect of retarding the start of fuel injection (SOI), as compared to the nominal conditions.
Figure 7:
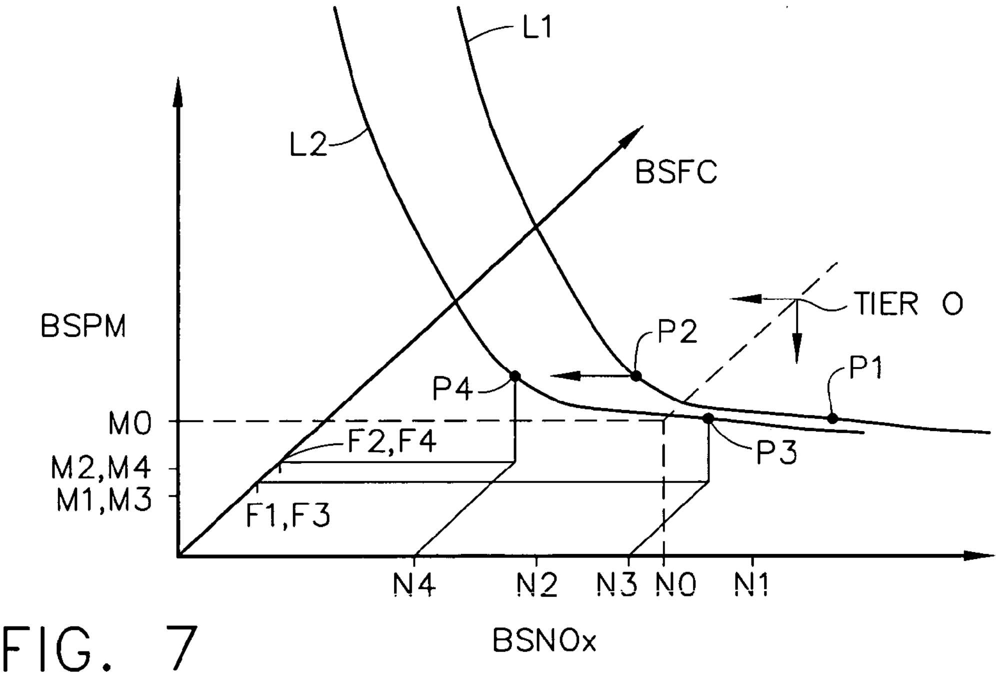
FIG. 7 is a chart similar to FIG. 6 illustrating the effect of lowering intake manifold air temperature.

Referring to FIGS. 6 through 9, various changes or modifications to the engine E or the manner in which air and fuel are supplied to the cylinder C affect the resulting level of each type of exhaust emission, as well as engine fuel economy and overall engine performance. In FIG. 6, a line L1 is a curve representing NOx and PM levels in an engine's exhaust, and engine performance level as represented by fuel consumption, all for a nominal set of engine operating conditions. By way of example, for a conventional engine E, the start of injection (SOI) may be at TDC (top dead center), the engine's manifold air temperature may be about 150° F. (65° C.), the compression ratio may be from about 14.5:1 to about 16:1, and the turbocharger inlet nozzle flow area may be about 28.3 square inches. An engine operating with these nominal parameters would define a nominal point P1 on curve L1 with respect to fuel consumption, and NOx, and PM values. In FIG. 6, the nominal brake specific NOx (BSNOx), nominal brake specific particulate matter (BSPM), and nominal brake specific fuel consumption (BSFC) values for the point P1 are denoted on their respective axes at N1, M1, and F1. Orthogonal leader lines to the value M1 are omitted for clarity.

The EPA Tier 0 values of BSNOx and BSPM are represented by the dashed lines. That is, the three dimensional volume to the left of N0 for BSNOx and below M0 for BSPM represents acceptable levels of these two types of emissions. It can be seen that the nominal operating point P1 results in the nominal BSPM value of M1 being within the Tier 0 limit of M0, while the nominal BSNOx value of N1 is above the Tier 0 limit of N0.

If the start of injection (SOI) is retarded, so that the engine operating point moves to the left along line L1 to point P2, the corresponding NOx, PM, and fuel consumption values are now denoted on their respective axes at N2, M2, and F2.

For example, for the nominal engine addressed here, retarding the SOI by 4 crankshaft degrees to 4° ATDC (after top dead center) has been found sufficient. This change has the effect of decreasing NOx to a value of N2 which is now below the Tier 0 limit of N0. It also has the effect of increasing PM, but the increase is to a level that is still below the Tier 0 limit of M0. Unfortunately, brake specific fuel consumption has substantially increased from a level of F1 to a level of F2, representing a decrease in the thermal efficiency of the engine.

More specifically, with respect to each of the three factors comprising the graph, for a retarded SOI, the engine will experience a reduced resonance time and a reduction in in-cylinder temperature resulting in reduced BSNOx, a reduced thermal efficiency reflected as increased BSFC, and a reduced premix burn resulting in an increased BSPM level.

Some changes in engine operating characteristics are known to result in a change in one emission level without significant changes in other emission levels or operating efficiency. For example, referring to FIG. 7, the effects on NOx, PM, and fuel consumption are shown with respect to changes in the intake manifold air temperature (MAT). If the manifold air intake temperature is reduced as indicated by the arrow, the curve represented by line L1 now shifts to become curve L2 having data points P3 and P4 corresponding to the points P1 and P2, respectively, on curve L1. This shift results in lower in-cylinder temperatures. If the SOI is retarded as previously discussed, the corresponding NOx data points shift from N3 to N4, as indicated. The overall results of reducing MAT is shown to be a reduction in NOx. The effect of the temperature reduction with respect to both PM and engine efficiency as represented by fuel consumption is essentially minimal. As shown, the data points M3 and M4 for particulate matter essentially correspond to the data points M1 and M2, respectively, and the data points F3 and F4 for fuel consumption essentially correspond to the data points F1 and F2, respectively. Essentially, the reduction in NOx is due to lower in-cylinder temperatures because of the reduction in MAT, but this has minimal, if any, effect on PM or fuel consumption. Reducing the manifold air temperature is accomplished using the intake air cooling system A.

Figure 8:
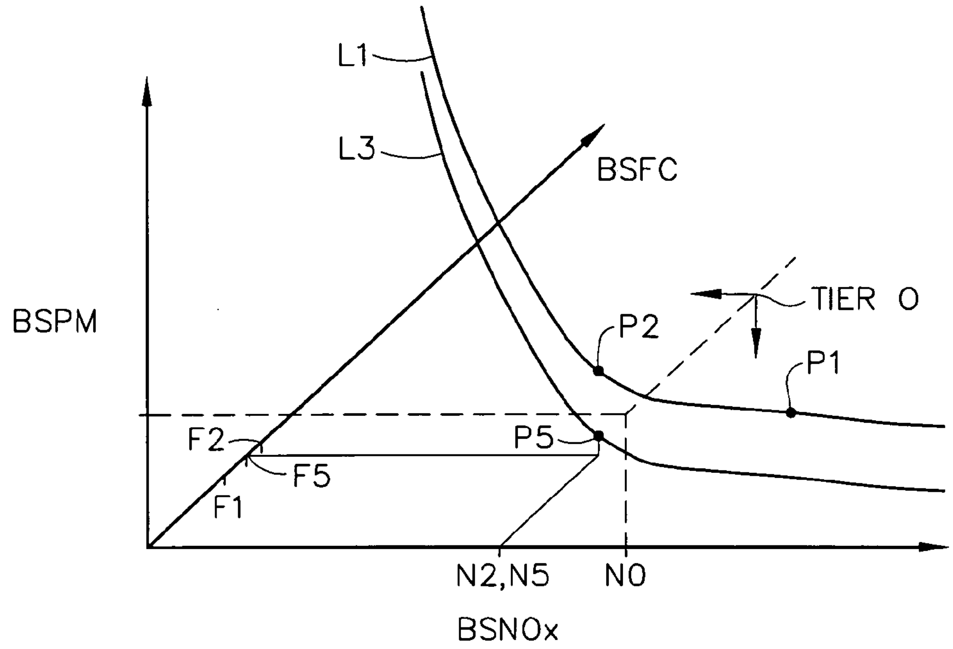
FIG. 8 is a chart similar to FIG. 6 illustrating the effect of increasing the compression ratio, as compared to the nominal conditions.

However, for the nominal engine being addressed, it can be desirable to both lower the MAT and retard the SOI, to achieve a desired result in lowering NOx to within the Tier 0 limit. Therefore, it will be desirable to compensate for the aforementioned loss of thermal efficiency which results from retarding the SOI. This can be achieved, at least partly, by increasing the piston crown height, as shown in FIG. 3 relative to FIG. 2, to increase the compression ratio. FIG. 8 shows the effects of increasing the compression ratio on NOx, PM, and fuel consumption. For example, for the nominal engine addressed here, a compression ratio increase from about 14.5 to about 17.4 has been found advantageous. One skilled in the art will recognize that there are limits on the level to which the compression ratio should be increased, having to do with such considerations as the strength of various engine components and the required starting torque. At any rate, if the compression ratio is increased, the operation of the engine shifts from curve L1 to curve L3, having a data point P5 corresponding to the data point P2 on line L1. As indicated in FIG. 8, this shift results in improved thermal efficiency, higher in-cylinder temperatures, and an increase in fuel vaporization. That is, where the SOI is retarded along curve L3, to the point P5, as previously discussed, the operational characteristics previously represented by the data points N2 and F2 on curve L1 are now represented by the data points N5 and F5, respectively, on curve L3. The result of retarding SOI is similar to that shown in FIG. 6. Specifically, as SOI is retarded, the effect is to decrease NOx, but to increase fuel consumption, indicating a decrease in thermal efficiency. So, while retarding SOI would decrease the level of NOx in the exhaust gas, this would also have the unwanted effect of decreasing thermal efficiency of the engine. To compensate, the engine compression ratio has been increased, shifting the operation of the engine from curve L1 to curve L3.

It can be seen that operating the engine along curve L3 leaves the NOx level within the Tier 0 requirements, while reducing but not entirely eliminating the effect of SOI retardation on engine thermal efficiency. That is, while increasing the compression ratio to this extent has somewhat compensated for the efficiency loss resulting from SOI retardation, the engine is still not operating at the same level of fuel efficiency as it would have exhibited without SOI retardation. This shortfall is caused at least in part by a decrease in the performance level of the turbocharger. One effect of an increased compression ratio is a decrease in the level of energy in the exhaust gas. Since the turbocharger is driven by the exhaust gas, any decrease in the energy level of the exhaust gas causes a decrease in the rotational speed and performance of the turbocharger, below a nominal level. This decrease in the performance level of the turbocharger manifests itself as a decrease in intake manifold air pressure, which results in a decrease in thermal efficiency, or an increase in brake specific fuel consumption. Thus, while the increase in compression ratio tends to alleviate the increase in fuel consumption, there is a shortfall in this effect, because of the reduced performance of the turbocharger.

So, the present invention provides an increased flow velocity in the exhaust gas flowing into the drive side of the turbocharger, by decreasing the flow area of the turbocharger inlet nozzle, as shown in FIG. 5 relative to FIG. 4. Specifically, the flow area of the turbocharger inlet nozzle is decreased by an amount sufficient to raise the flow velocity to a level which will return turbocharger speed to its nominal level. For the nominal engine addressed here, it has been found sufficient, for example, to reduce the turbocharger inlet flow area from 28.3 square inches to 25.4 square inches.

Figure 9:
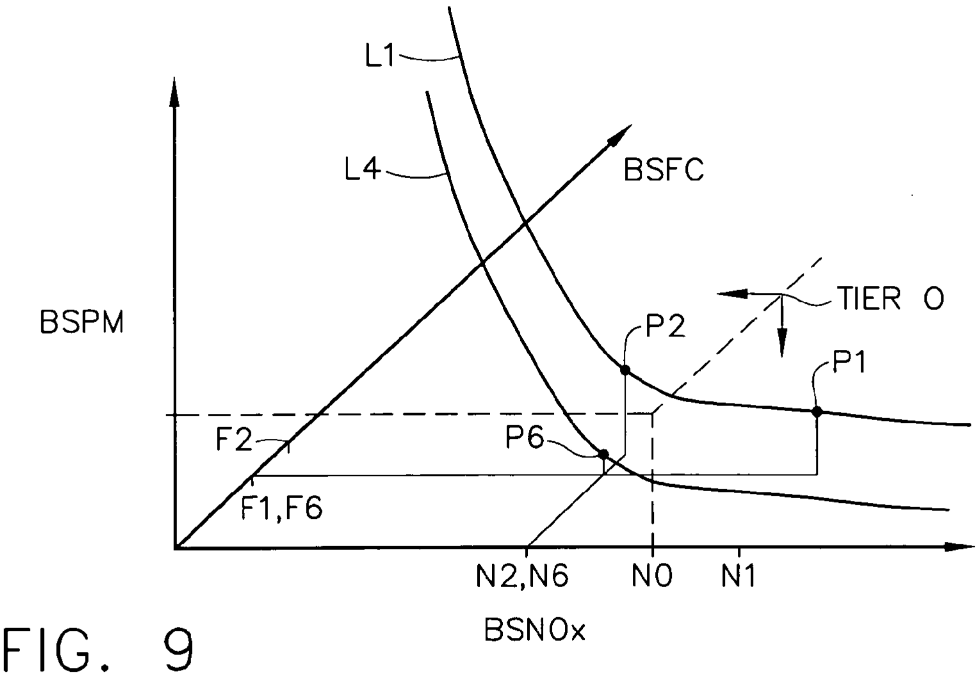
FIG. 9 is a chart similar to FIG. 6 showing the overall effect produced by retarding SOI timing, increasing compression ratio, and reducing turbocharger inlet flow area, to reduce NOx to a level below EPA Tier 0 requirements, while maintaining engine performance and keeping fuel consumption at an acceptable level.

FIG. 9 represents a composite of the various steps discussed above. The curve L4 represents operation of the engine with an increased compression ratio and a reduced turbocharger inlet flow area. For a retarded SOI as represented by the point P6, the resultant NOx level has been reduced to a value represented by N6, substantially the same as N2, while the thermal efficiency has been maintained at a value represented by F6, which is the same as F1. So, in accordance with the method of the invention, by combining the steps of retarding the start of injection (SOI) as shown in FIG. 6, together with increasing the compression ratio as shown in FIG. 8, and reducing the turbocharger inlet flow area, the resulting NOx level falls within the Tier 0 limits, while the thermal efficiency has been maintained essentially at the nominal level represented by the F1 value of BSFC. Through implementation of the present invention, thermal efficiency could also be slightly improved over the value represented by F1.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

We claim:

1. A method for reducing emissions from a turbocharged locomotive diesel engine while maintaining engine performance, said method comprising:

providing a plurality of cylinders in said engine, each cylinder having a cylinder head, pistons within the cylinders each having a piston crown and moving to a position adjacent to the cylinder head for compressing gas in the cylinder for combustion;

providing a turbocharger for supplying air under pressure to the cylinders, with the turbocharger being driven in part by a flow of exhaust gases from the engine;

providing a fuel injection system for injecting fuel into the cylinders;

retarding the start of fuel injection in each combustion cycle, to reduce the level of nitrogen oxides in the exhaust gas, with said retarded injection timing also resulting in a reduction in thermal efficiency;

increasing compression ratio in each cylinder to 17.4, thereby compensating for said reduction in thermal efficiency, with said increased compression ratio also resulting in a reduced exhaust gas energy level and a resultant decrease in turbocharger speed; and restricting the turbocharger inlet to the flow of exhaust gas to the turbocharger, by reducing turbocharger nozzle ring flow area to 25.4 square inches to increase the exhaust gas flow velocity to maintain said turbocharger speed and boost level of the air under pressure to the cylinders, thereby compensating for said reduction in exhaust gas energy level.

2. In a turbocharged locomotive diesel engine for operation with reduced engine emissions while retaining engine performance, the engine comprising a plurality of cylinders each having a cylinder head, pistons within the cylinders each having a piston crown and moving to a position adjacent to the cylinder head for compressing gas in the cylinder for combustion, a turbocharger for supplying air under pressure to the cylinders, with the turbocharger being driven in part by a flow of exhaust gases from the engine, and an outlet from the engine for the flow of exhaust gas under pressure from the cylinders to the turbocharger, the improvement comprising:

pistons having piston crowns moving more closely to their respective cylinder heads to increase engine compression ratio to 17.4, with said increased compression ratio resulting in a reduced exhaust gas energy level; and a turbocharger inlet restriction to the flow of exhaust gas to the turbocharger to increase the exhaust gas flow velocity to maintain turbocharger speed and boost level of the air under pressure to the cylinders thereby compensating for said reduction in exhaust gas energy level, said inlet restriction comprising a nozzle ring having a flow area of 25.4 square inches.

* * * * *